US011499306B2

(12) United States Patent
Schwab et al.

(10) Patent No.: US 11,499,306 B2
(45) Date of Patent: Nov. 15, 2022

(54) DIFFERENTIAL SETTLEMENT ANCHORS (71) Applicant: Thermacrete LLC, Lake Bluff, IL (US)

(72) Inventors: Frank Schwab, Prospect Heights, IL (US); David A. Markle, West Chicago, IL (US)

(73) Assignee: Thermacrete LLC, Lake Bluff, IL (US)

( * ) Notice: Subject to any disclaimer, the term of this patent is extended or adjusted under 35 U.S.C. 154(b) by 0 days.

(21) Appl. No.: 16/592,382

(22) Filed: Oct. 3, 2019

(65) Prior Publication Data

US 2021/0102368 A1 Apr. 8, 2021

(51) Int. Cl.
*E04B 1/98* (2006.01)
*E04B 1/36* (2006.01)
*E04H 9/02* (2006.01)
*E04B 1/41* (2006.01)
*E04B 1/38* (2006.01)

(52) U.S. Cl.
CPC .................. *E04B 1/36* (2013.01); *E04B 1/40* (2013.01); *E04H 9/021* (2013.01); *E04B 2001/405* (2013.01)

(58) Field of Classification Search
CPC .... E04B 2001/2415; E04B 1/40; E04H 9/021
USPC .......................................................... 52/712
See application file for complete search history.

(56) References Cited

U.S. PATENT DOCUMENTS

| 1,075,252 A | 10/1913 | Graham |
| 1,935,574 A | 11/1933 | Munroe et al. |
| 2,990,920 A * | 7/1961 | Hoffman, Jr. ...... A47B 96/1408 52/645 |
| 3,300,931 A | 1/1967 | Lutze |
| 3,363,371 A | 1/1968 | Villalobos |
| 3,558,005 A * | 1/1971 | Crabtree .................. B64D 1/02 221/90 |
| 3,611,653 A | 10/1971 | Zinn |
| 3,774,359 A | 11/1973 | Kahn |
| 3,837,984 A * | 9/1974 | Wagner et al. ............ C09J 7/22 428/349 |
| 3,852,931 A | 12/1974 | Morse et al. |

(Continued)

FOREIGN PATENT DOCUMENTS

| AU | 2005277009 B2 | 3/2006 |
| CA | 2575061 C | 10/2012 |

(Continued)

OTHER PUBLICATIONS

European Patent Office; Extended European Search Report for European Application No. 20173512.3; dated Oct. 2, 2020; 7 pages.

*Primary Examiner* — Basil S Katcheves
(74) *Attorney, Agent, or Firm* — Bishop, Diehl & Lee, Ltd.

(57) ABSTRACT

The present invention provides an anchor assembly for attaching a first structure to a second structure. The anchor assembly has a body having a first face and a second face. The first face is transverse to the second face and has an elongate slot. The second face has a through hole. The body is fabricated from a material that fails at a temperature in excess of 1,000° F. A fastening member is positioned in the elongate slot for connecting the first face to the first structure and for sliding engagement with the elongate slot in response to relative movement of the first structure and the second structure.

9 Claims, 7 Drawing Sheets

(56) References Cited

U.S. PATENT DOCUMENTS

| | | | |
|---|---|---|---|
| 3,885,362 A | 5/1975 | Pollock | |
| 3,913,290 A | 10/1975 | Billing et al. | |
| 4,185,437 A | 1/1980 | Robinson | |
| 4,186,714 A | 2/1980 | Danckert et al. | |
| 4,215,664 A | 8/1980 | Hatz | |
| 4,295,691 A | 10/1981 | Rubenthaler | |
| 4,371,858 A | 2/1983 | Kanoi et al. | |
| 4,453,359 A | 6/1984 | Robinson | |
| 4,531,338 A | 7/1985 | Donatt | |
| 4,605,090 A | 8/1986 | Melfi | |
| 4,641,468 A | 2/1987 | Slater | |
| 4,674,253 A | 6/1987 | Young | |
| 4,702,046 A | 10/1987 | Haugen et al. | |
| 5,335,893 A * | 8/1994 | Opp | B64C 1/066 248/635 |
| 5,426,908 A | 6/1995 | Shayman | |
| 5,460,348 A * | 10/1995 | Cox | F16M 5/00 248/237 |
| 5,526,629 A | 6/1996 | Cavaness | |
| 5,661,273 A | 8/1997 | Bergiadis | |
| 5,907,932 A | 6/1999 | Leconte et al. | |
| 5,950,277 A | 9/1999 | Tallmadge et al. | |
| 5,953,883 A | 9/1999 | Ojala | |
| 5,979,130 A * | 11/1999 | Gregg | F16B 9/058 52/295 |
| 6,266,936 B1 | 7/2001 | Gelin | |
| 6,421,973 B1 | 7/2002 | Gregg et al. | |
| 6,460,301 B1 | 10/2002 | Mckee | |
| 6,494,008 B1 | 12/2002 | Bloem et al. | |
| 6,612,087 B2 * | 9/2003 | diGirolamo | E04C 3/07 52/712 |
| 6,729,094 B1 | 5/2004 | Spencer et al. | |
| 7,398,856 B2 | 7/2008 | Foster et al. | |
| 7,946,384 B2 | 5/2011 | Foster et al. | |
| 8,235,350 B2 * | 8/2012 | Tetsuda | F16F 1/3732 248/560 |
| 8,424,263 B2 | 4/2013 | Hsieh | |
| 9,140,017 B1 * | 9/2015 | Oliver | E04F 13/0882 |
| 9,145,679 B2 | 9/2015 | Ahern | |
| 2001/0010140 A1 | 8/2001 | Ritter et al. | |
| 2002/0092703 A1 | 7/2002 | Gelin et al. | |
| 2003/0070367 A1 | 4/2003 | Gelin et al. | |
| 2003/0192279 A1 | 10/2003 | Hughart | |
| 2004/0098934 A1 | 5/2004 | Lawson et al. | |
| 2005/0016104 A1 | 1/2005 | Seccombe | |
| 2005/0188626 A1 | 9/2005 | Johnson | |
| 2006/0042874 A1 * | 3/2006 | Foster | E04B 2/7411 181/285 |
| 2006/0048997 A1 | 3/2006 | Foster et al. | |
| 2007/0125017 A1 | 6/2007 | Blount | |
| 2008/0184643 A1 | 8/2008 | Foster et al. | |
| 2009/0282759 A1 * | 11/2009 | Porter | E04B 2/7457 52/220.1 |
| 2013/0255178 A1 * | 10/2013 | Judd | E04B 1/344 52/646 |
| 2014/0209270 A1 | 7/2014 | Imbabi et al. | |
| 2014/0305046 A1 * | 10/2014 | Stearns | E04D 3/36 52/58 |
| 2014/0306088 A1 | 10/2014 | Dryburgh et al. | |
| 2017/0166001 A1 | 6/2017 | Shaw et al. | |
| 2017/0298626 A1 | 10/2017 | Shaw | |
| 2018/0135293 A1 * | 5/2018 | Daudet | E04B 1/2403 |
| 2019/0184602 A1 | 6/2019 | Liu et al. | |

FOREIGN PATENT DOCUMENTS

| | | |
|---|---|---|
| CA | 2994868 A1 | 4/2018 |
| CN | 108978983 A | 12/2018 |
| GB | 190617654 | 12/1906 |
| JP | 04124072 A | 4/1992 |
| JP | 6058470 B2 | 1/2017 |
| MX | 315769 | 11/2013 |
| NZ | 553901 A | 12/2010 |
| WO | 2006023999 A2 | 3/2006 |
| WO | 2006023999 A3 | 3/2006 |
| WO | 2008097102 A1 | 8/2008 |
| WO | 2017011858 A1 | 1/2017 |

\* cited by examiner

DIFFERENTIAL SETTLEMENT ANCHORS

CROSS-REFERENCE TO RELATED APPLICATIONS

None.

FEDERALLY SPONSORED RESEARCH OR DEVELOPMENT

Not Applicable.

BACKGROUND OF THE INVENTION

1. Technical Field

The present invention pertains to an anchor connecting a first structure to a second structure with a fastener, and the anchor has an elongate slot supporting sliding motion of the fastener in response to relative movement of the first structure and the second structure. More particularly, the present invention provides an anchor for use in firewall barrier assemblies, acoustic barrier assemblies, and curtain wall or cladding wall applications where dissimilar materials are in use and the conditions are ripe for differential structural settlement to occur.

2. Background

Differential settlement between adjacent structural elements is known to occur in buildings of all types. Causes of differential settlement are numerous.

It is common on home and building construction sites to connect a first structure on one foundation to a second structure on a second foundation. Due to differences in the conditions of the foundations and associated structures, conditions are ripe, over a period, for differential settling to occur causing the structures to move with respect to one another. Conditions such as the depth of the foundations, materials used in the foundations, the weight of the structures, soil types, and numerous other factors that impact weight bearing conditions. Differential settlement is also known to occur between structural elements that are supported on a common foundation due to differences in the physical properties of the structural elements in the construction. A loss of moisture content in wood is known to cause shrinkage in the wood and lead to differential settlement.

Stud wall construction of walls and other structures is in widespread use in the United States. Typically, stud wall construction has wood or metal studs. Wood framing includes, for example, a series of 2 by 4 wood studs, generally 1½ by 3½ inch in cross-sectional size. The studs extend vertically between, and are secured to, a lower stud plate on the floor and double upper stud plates at the ceiling. In metal stud construction, the studs are made of sheet metal having a generally C-shaped cross-section.

In conventional stud wall construction, the walls are finished by securing to the studs gypsum board, plywood, plaster or the like (called "wall board" for convenience); and sometimes insulation of various types is installed between the studs and the wall boards. Such stud wall construction provides little barrier to fire or sound transfer.

SUMMARY OF THE INVENTION

The present invention provides an anchor assembly for attaching a first structure to a second structure. The anchor assembly has a body having a first face and a second face. The first face is transverse to the second face and has an elongate slot. The second face has a through hole. A fastening member is positioned in the elongate slot for connecting the first face to the first structure and for sliding engagement with the elongate slot in response to relative movement of the first structure and the second structure.

The present invention further provides a structural assembly. The structural assembly has a frame assembly having a first plate extending in a first direction and having a top surface, a second plate having a bottom surface spaced from the top surface and in registration therewith. The frame further has a first plurality of elongate members spaced from one another and extending in a second direction transverse to the first direction and each elongate member having opposed ends. The elongate members extends between the top surface and the bottom surface with one end of each elongate member being attached to the first plate and the opposite end being attached to the second plate. The structural assembly further has a structure having a continuous outer planar surface adjacent the first frame. An anchor assembly having a body having a first face and a second face, the first face is transverse to the second face. The first face has an elongate slot and the second face has a through hole. A fastening member is positioned in the elongate slot connecting the first face to the structure. The second face is connected to the preformed concrete wall. A bearing force is transferred from the preformed concrete wall to the frame through the anchor. The fastening member is capable of sliding in the elongate slot along the second direction in response to relative movement of the frame and the preformed concrete wall along the first direction.

These and other aspects and attributes of the present invention will be discussed with reference to the following drawings and accompanying specification.

DETAILED DESCRIPTION

The present invention is susceptible to embodiments in many different forms. Preferred embodiments of the invention are disclosed with the understanding that the present disclosure is to be considered as exemplifications of the principles of the invention and are not intended to limit the broad aspects of the invention to the embodiments illustrated.

It is common in buildings and homes to experience differential settlement between one structural element and another structural element. For example, in homes differential settlement can lead to uneven floors, curved walls, separation between adjacent walls among numerous other examples. The anchor 15 of the present invention is provided to connect a first surface with a first face of the anchor to a second structure with a second face. The anchor allows for relative movement of the first and second structures without destroying their connections to the anchor. The anchor 15 and associated structures of the present invention accommodate movement between two adjacent structural elements of a construction up to the design limit of the anchor without causing separation, cracking or shear between the structural elements.

The first structure and the second structures can be of the same construction or of a different construction. The first structure can be made from the same materials or different materials from the second structure. The first structure and the second structure can, for example, be a wall stud, a floor joist, a ceiling joist, a lintel, a preformed concrete wall, a wall board, a brick, a cinder block, a telephone tile, metal panels, steel panels, steel studs, metal studs, and many more.

Figure 1:
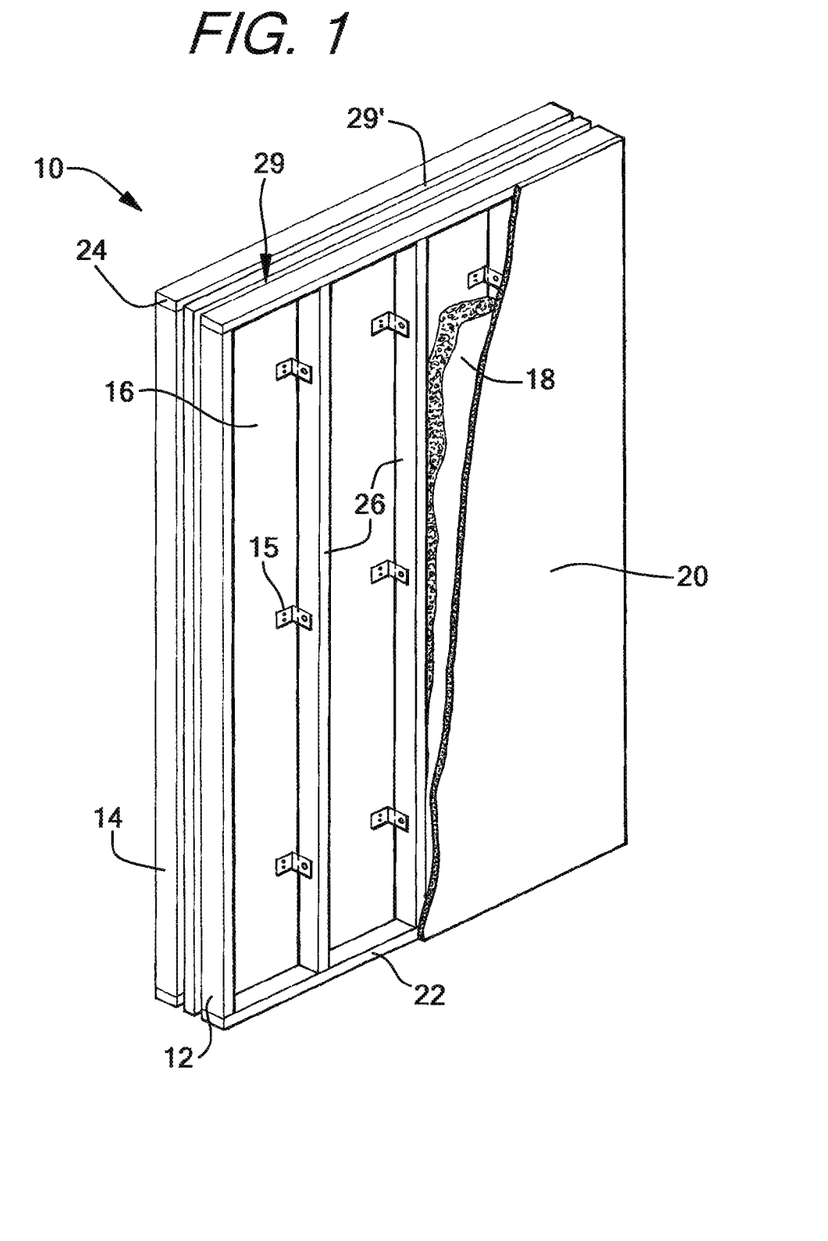
FIG. 1 is an isometric view, with portions broken away, of a firewall barrier assembly.

FIG. 1 shows a structural assembly 10 having a first structure 12 spaced from a second structure 14. The first structure and the second structure are of a frame construction. A preformed concrete wall 16 is positioned between the first and second structures 12 and 14 and spaced a distance from both to form a firewall barrier assembly. A plurality of vertically spaced anchors 15 connect the preformed concrete wall 16 to the first structure 12 and to the second structure. In this embodiment, the anchors are made from a material that fails at a temperature of below 1,000° F. In the event of a fully engaged fire, the anchors in a firewall barrier assembly are designed to fail so that the wall board can fall away from the frame structure without pulling down the frame or the preformed concrete wall 16. This helps maintain the firewall barrier 10 substantially intact for 2 to 4 hours in a fire. It should be understood that the present invention is not limited to firewall barrier assemblies or acoustic barrier assemblies and the anchors do not have to have this property in non-firewall applications. Also depicted are optional insulating material 18 and optional wall board material 20. As will be discussed in greater detail below, the anchors 15 have an elongate slot oriented along a first direction to compensate for relative movement in the first direction of the first structure 12 and the preformed concrete wall 16.

In one preferred form of the structural assembly is a firewall barrier assembly 10, the first structure 12 and the second structure 14 are of a conventional stud wall frame construction including a base stud plate 22, and an upper stud plate 24 extending in a first direction, in this example horizontally. The base stud plate 22 is typically secured to a floor and the top stud plate is secured to a ceiling. The upper stud plate 24 can include two stud plates stacked on top of one another, although only a single top stud plate is shown. A plurality of studs 26 extend along a second direction transverse to the first direction, in this example vertically, and are secured at their opposed ends to the base stud plate 22 and the upper stud plate 24.

FIG. 1 shows the floor stud plate, the ceiling stud plate, and the vertically extending studs are made of wood; these members usually are 1½ by 3½ inches in cross-sectional size in the U.S. The studs 26 are spaced 16 inches on center according to standard U.S. practice. Such stud wall frame is of conventional type and the construction thereof will be apparent to those skilled in the art from the description herein. It is contemplated replacing the components of the wooden stud frame with components made from metal, plastic, or a composite material. It is also contemplated that the first structure can be made of components that are larger or smaller in dimension than the U.S. standard practice so the size of the anchor may be smaller or larger than those shown.

Figure 4A:
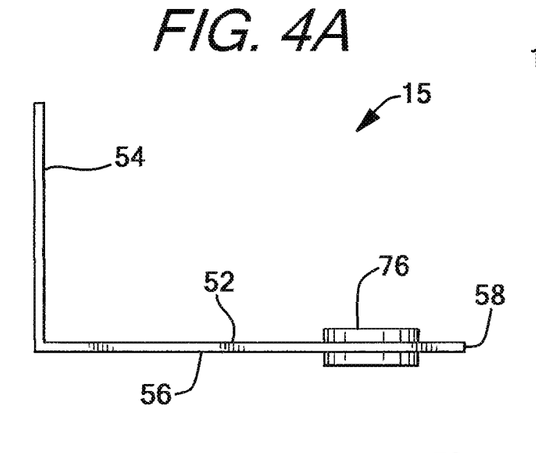
FIGS. 4A-4C respectively are a side elevation view, a top plan view, and a front elevation view of an anchor of the present invention.
Figure 4B:
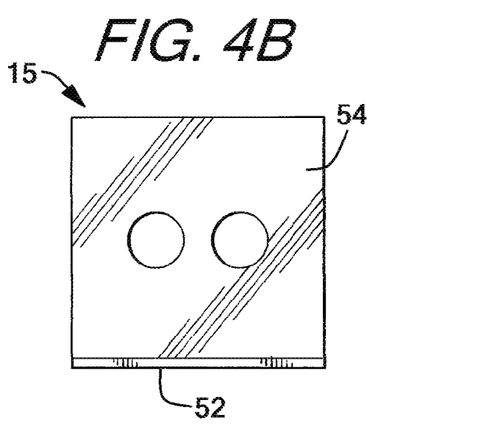
Figure 4C:
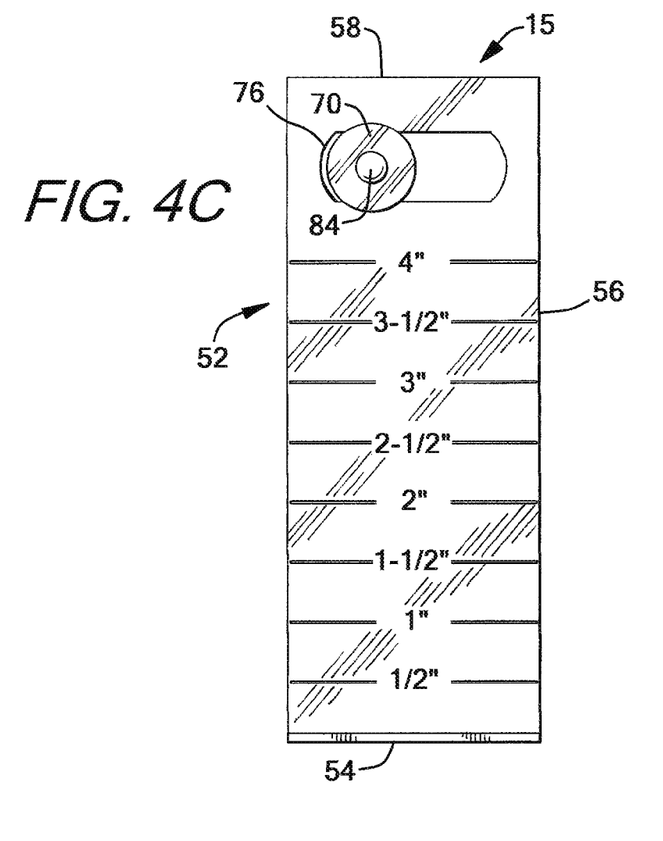

The concrete wall 16 board should be spaced from the first structure 12 and the second structure to respectively provide an air gap 29,29'. Thus, the dimensions of the anchors 15 are selected to provide the desired air gaps. For example, the first face of the anchor 15 of FIGS. 4A-4C provides a 4 inch air gap for a first face 52 having a length of 5.5 inches. The air gaps 29, 29' can be of substantially the same dimension to form a symmetrical structure, or, in a more preferred form of the invention, the distances will be different to define an asymmetrical structure. The difference in the distances will typically be 3 inches or less and more preferably will be 1½ inch or less.

FIGS. 2A-D show L-shaped anchors 15 of varying configurations but all include a first face 52 and a second face 54. The first face 52 has an elongate slot 55 extending between lateral edges 56 of the anchor 15 and spaced from an end edge 58 of the anchor. The first face 54 has additional through holes 60 in alignment with a central portion of the elongate slot 55 and centrally disposed between the lateral edges 56. The second face 54 has two through holes 62 aligned along a width dimension of the second face 54.

Figure 2A:
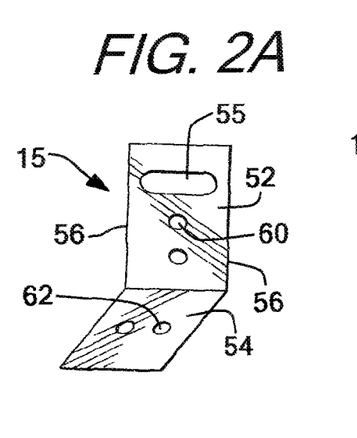
FIGS. 2A-2D are isometric views of a variety of anchors of the present invention.
Figures 2B, 2C:
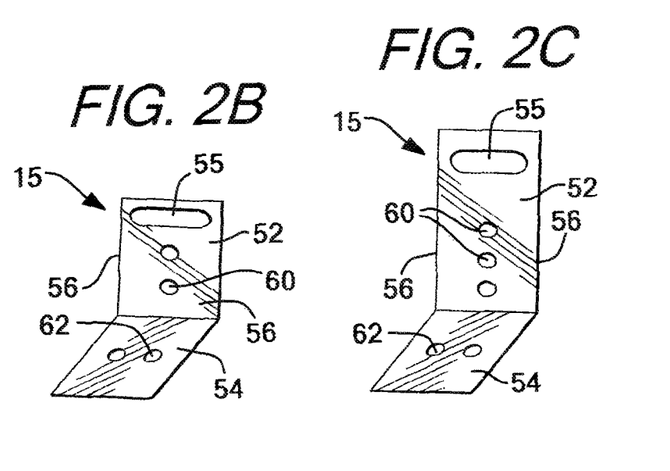

The anchor 15 shown in FIG. 2A has equal length first and second faces and an enlarged elongate slot 55. FIG. 2B has equal length first and second faces and a narrow elongate slot 55. The enlarged elongate slot 55 is dimensioned to receive a grommet assembly 76, described below, for attaching the first face 52 to the first structure 12. The narrow slot 55 is dimensioned to receive a fastener such as a screw 84 or a screw 84 and washer 82 assembly to attach the first face 52 to the first structure 12 and without a grommet 70.

Figure 2D:
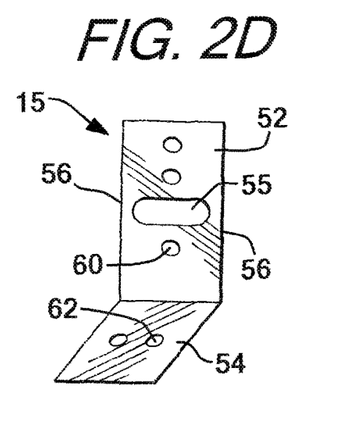

FIG. 2C has a first face 52 of greater length than the second face 54 and has an enlarged elongate slot 55. FIG. 2D shows the enlarged elongate slot 55 positioned closer to the second face 54 than in FIG. 2C. Depending on the geometry of the first structure 12, the first face 52 and the second face 54 can have a length from 0.5 inches to 12 inches, more preferably from 1.0 inch to 8 inches, even more preferably from 1.5 inch to 7 inches, and yet even more preferably 2 inches to 6 inches. The length of the first face 52 and the second face 54 can be the same or different. The first face 52 is shown longer than the second face 54 but the converse can also work with the second face 54 being longer than the first face 52.

Figure 2E:
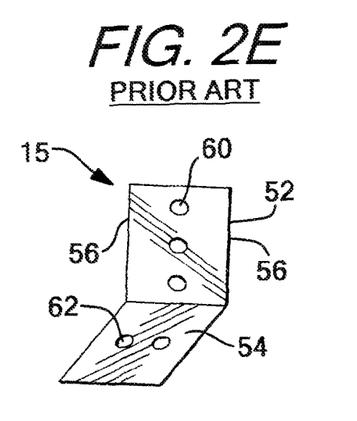
FIG. 2E is an isometric view of a prior art melt away anchor.

FIG. 2E shows a prior art L-shaped anchor for use in an acoustical firewall barrier assembly disclosed in commonly assigned U.S. Pat. No. 7,946,384 which is incorporated herein by reference in its entirety and made a part hereof. The prior art anchor has equal length first and second faces 52,54. Three vertically aligned through holes 60 are on the first face 52 and two horizontally aligned through holes 62 are centrally disposed on the second face 54. There is no elongate slot. The prior art L-shaped anchor can also have a longer first face than the second face but is not shown.

Figure 3A:
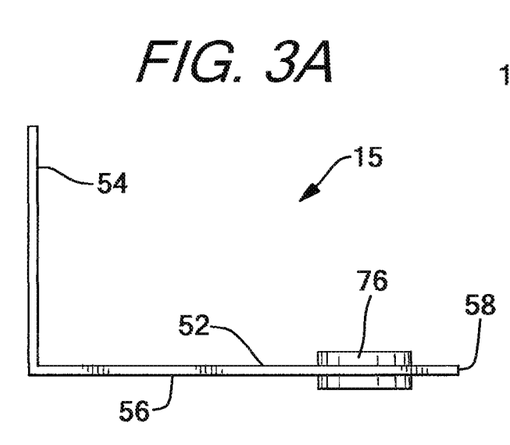
FIGS. 3A-3C respectively are a side elevation view, a top plan view, and a front elevation view of an anchor of the present invention.
Figure 3B:
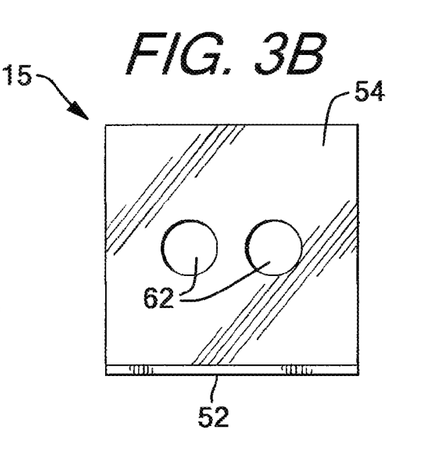
Figure 3C:
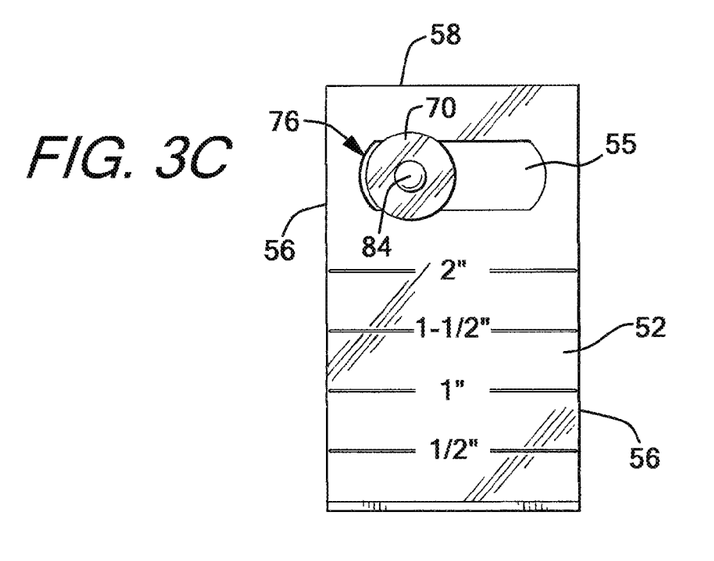

FIGS. 3A-3C show an anchor assembly having an anchor having a first face 52 3.5 inches long, and the second face 54

2 inches long. Both faces are 2 inches wide this is meant as a guideline only as various widths will be used dependent on the amount of travel allowed in the slotted portion of the anchor which will be design based. The enlarged elongate groove 55 is 1.5 inches long and 0.5624 inches high and is centrally disposed between the lateral sides 56. The elongate slot 55 could be positioned farther away from the end edge 58 and closer to the second face 54 as is shown by comparing the anchors of FIGS. 2C and 2D. A grommet assembly 76 is disposed in the elongate slot and has a grommet 70, a metal washer 80 adhered by a layer of an adhesive 82, and a fastener or screw 84 through the grommet and washer. The screw 84 has a center point (+) at a minimum distance of 0.75 inches from the end edge 58 of the anchor 15. The grommet 70 has an annular groove 72 of a diameter GD of $9/16$ inch (0.5625 inches), a through hole 74 with an inner diameter ID of $7/32$ inch, and forms a snug fit in the groove 55 and can be slightly compressed when in the slot. The grommet 70 is capable of sliding in the groove 55 to compensate for movement of the first structure 12 with respect to the preformed concrete wall 16. The second face 54 of the anchor 15 has two through holes 62 centrally disposed.

FIGS. 4A-C is the same as that shown in FIGS. 3A-3C but the first face is 5.5 inches long instead of 3.5 inches.

The dimensions of the elongate slot are selected, in part, to accommodate the type of fastener used to connect the first face 52 to the first structure 12. FIGS. 3A-3C and 4A-4C show using a grommet assembly 76 for connecting the first face 52 to the first structure 12, and, therefore, the slot 55 has to be larger than a standard slot. FIG. 2B shows a standard slot, narrower than the enlarged slot, for accommodating a smaller diameter fastener such as a screw. The length of the slot determines the amount of differential settlement that can be accommodated by the slot.

The anchor 15 can be made from any suitable material including metal, polymer, wood or a composite material. In a preferred form of the invention for firewall barrier assembly, the anchor will be fabricated from a material that fails at temperatures of approximately 800° F.-1,600° F. and more preferably in excess of 1,000° F. What is meant by the term "fail" is the anchor melts or degrades to the point where it can no longer effectively serve as an anchor. Suitable metals include aluminum, aluminum alloys, and those metals having a melting point temperature within the limits set forth above. Suitable polymers include those high temperature resistant polymers and can be a thermoplastic-type polymer or thermosetting-type polymer. Suitable polymers include, but are not limited to, polyimides, poly(ethersulfones), poly (phenylene sulfides), poly(phenylene oxide), polyketones, engineering thermoplastics or other temperature resistant polymers. Numerous other applications for the anchors 15 do not require this physical property.

Figure 5A:
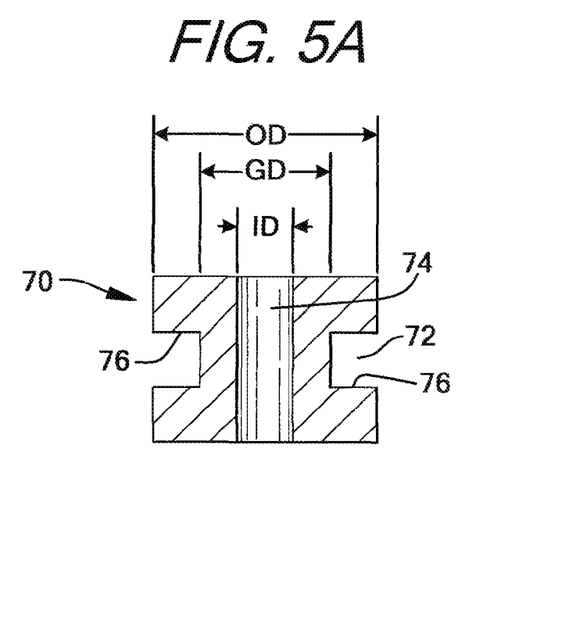
FIGS. 5A-5B are a vertical cross-sectional view and a top plan view of a grommet.
Figure 5B:
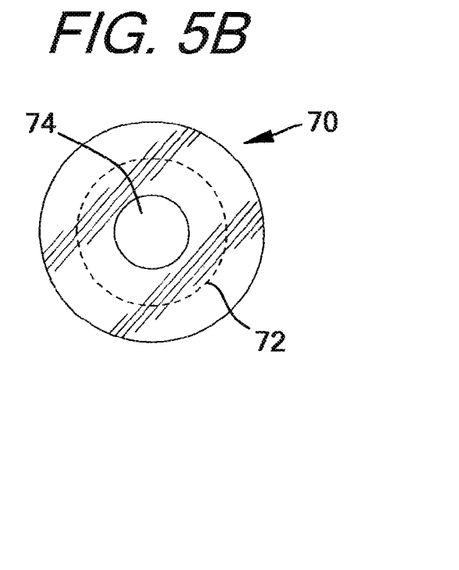

FIGS. 5A and 5B show a grommet 70 generally cylindrical in shape and having a circular shape in cross sectional dimension. The grommet 70 has a central portion of a reduced diameter forming an annular groove 72 designated GD for groove diameter. The grommet 70 also has an outer diameter OD and a through hole 74 having an inner diameter ID. Flanges 76 connect the OD to the GD. The grommet 70 is dimensioned to be inserted into the elongate slot 55 for sliding engagement therewith. The grommet is preferably made from polymers, natural rubber, synthetic rubbers or combinations of the same. The grommet preferably acts as a vibration dampener to dampen sound to act as an acoustical attenuator or barrier. In one preferred form, the grommet is made from neoprene. Suitable grommets are available in numerous shapes and sizes from, for example, Allstates Rubber & Tool, Inc. of Tinley Park, Ill. One such grommet is sold under MS-35489 and is available in groove sizes, GD, of fractions of an inch of $1/16^{th}$, $1/8^{th}$, $3/16^{th}$, and $1/4^{th}$. Even more preferably, a MS-35489 grommet with an ID of $5/16^{th}$ inch, $3/4$ inch GD, and 1 inch OD sold under the part number A2280.

Figure 6:
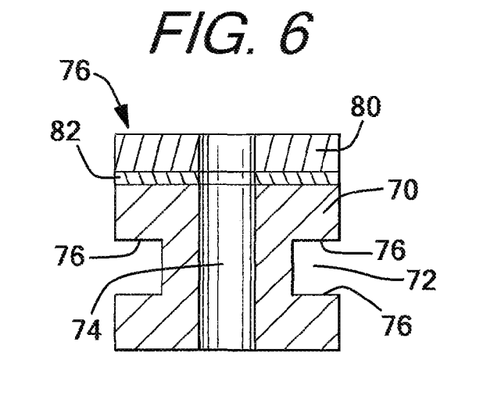
FIG. 6 is a vertical cross-sectional view of an anchor assembly of the present invention.
Figure 7:
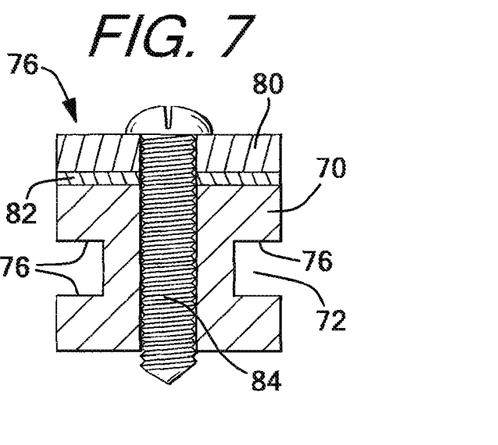
FIG. 7 is a vertical cross-sectional view of an anchor assembly of the present invention.

FIG. 6 shows a grommet assembly 76 having the grommet 70, a washer 80 and an adhesive layer 82 connecting the two. FIG. 7 adds a fastener 84 to the grommet assembly positioned in a through hole 84 of the washer 80 and the through hole 74 of the grommet 70. The washer 80 assists a user in inserting the grommet assembly 76 into the elongate slot 55 and in retaining the grommet assembly 76 in the elongate slot. The fastener 84 connects the first face 52 of the anchor 15 to a portion of the first structure 12, and more preferably, a member of the first structure such as a stud 26.

FIGS. 3C and 4C show the grommet assembly 76 inserted into the elongate slot 55 for reciprocating sliding engagement therein. The flanges 76 grip or hug an outer surface of the anchor, but allows for the grommet assembly 76 to slide in the groove 55. The grommet assembly 76 slides in response to relative movement of the first structure 12 and the preformed concrete wall 16. While the anchors 15 are shown with elongate slots 55 oriented vertically for compensating for relative vertical movement of the first structure and the preformed concrete wall, the elongate slot could be oriented along any direction such as a first direction for compensating for relative movement of the first structure and the preformed concrete wall along the first direction.

Suitable washers include those made from metal, plastic or rubber and are typically flat, spiral, slotted, star, or insulating. In one preferred form, the washer is a flat annulus or ring with a central hole, and more preferably a washer that has a large outer diameter with respect to the central hole diameter such as a fender washer. The fender washer is available in numerous outer diameter an inner diameter combinations. Preferably, the outer diameter of the washer is from 75% to 150% of the OD of the grommet. Most preferably, the outer diameter of the washer is equal to or greater than the OD of the grommet.

Suitable adhesives include those suitable for bonding metal to rubber and more preferably aluminum or zinc to rubber and even more preferably aluminum or zinc to neoprene. One suitable adhesive is sold by 3M under the tradename Neoprene High Performance Rubber and Gasket Adhesives 1300 and 1300L. Another suitable adhesive is a polyurethane adhesive sold under the tradename GORILLA GLUE®.

Suitable fasteners include nails, screws, brads, staples, or other. Most preferably, the fasteners referred to herein are a 25-20 gauge steel 8×1⅝ inch cement board masonry screw.

In one preferred form of the invention the preformed concrete wall 16 is fabricated from concrete and more preferably autoclave aerated concrete (AAC). AAC is lightweight compared to normal concrete. For example, typical AAC weighs one-fourth to one-fifth the weight of normal concrete, which weighs in the range 130 to 145 lbs/ft. AAC has extreme thermal properties. It displays no spalling of material when exposed to temperatures at or approaching 2,000 degrees Fahrenheit. AAC is an inorganic material resistant to weather decay and pest attack. AAC also provides significant acoustical barrier properties. Suitable AAC materials are sold by THERMACRETE the assignee of the present invention.

AAC is typically formed as a blend of sand or fly ash, lime, Portland cement, water, and an expansion agent of aluminum powder or paste. The mixture is usually cast into large molds and allowed to expand to a volume greater than the original semi-fluid mass. The expanded mass is sliced to desired dimensions and shaped into the structural elements mentioned above. The processed elements are then placed into large pressurized chambers called autoclaves to complete the curing or hardening of the finished product. The structural elements are typically cured for 8-12 hours at 12-13 atmospheric pressures at 360-385 degrees Fahrenheit.

In another preferred form of the invention the preformed concrete wall 16 is fabricated from aerated concrete which is also produced in structural elements such as panels and blocks. However, aerated concrete product is allowed to air cure in normal single atmospheric pressures and ambient temperatures. The process for achieving maximum strength takes longer. Typical curing time for aerated concrete is 7-28 days versus 20-24 hours for autoclaved aerated concrete. Aerated concrete is sold under the trade names FLEX-CRETE, PEARLITE, DURROCK and HARDIE BOARD.

In one preferred form of the invention, the preformed concrete wall 16 will have an intumescent material attached to a portion of the barrier material and more preferably to a peripheral portion thereof to extend between other preformed concrete walls or other structures. What is meant by intumescent is the material with swell or char when exposed to flame. Suitable intumescent materials include metal foils, fire-resistant fabrics, aluminum foil, stainless steel foil, fiberglass, alumina silica fabric and other intumescent materials well known to those skilled in the art. These intumescent materials can be used alone or in combination by blending or forming layer structures of the same. Intumescent adhesives can be used to hold, adhere or bind the intumescent materials together including 3M's CP-25 intumescent caulking material that can be obtained from 3M Fire Protection Products, St. Paul, Minn., or a FX-100 coating material available from Flame Seal Products, Inc. Houston, Tex. The intumescent material is available for purchase in many forms including strips of material such as those sold by AstroFlame® as intumescent fire seals.

The preformed concrete wall 16 will have a board of cement or concrete like material or aerated concrete or autoclaved aerated concrete (AAC) material. The autoclave aerated concrete and the aerated concrete are available as wall board panels and blocks in numerous shapes and sizes. The wall board panels are typically elongate having a length dimension substantially greater than the width dimension. Panel sizes include lengths of from 4 to 20 feet, widths of two to 8 feet and thicknesses of from 1 to 8 inches. The advantage of such elongate wall boards is that they may be easily formed into a wall when compared to building walls by stacking cement blocks.

Suitable wallboard material includes gypsum materials including drywall materials. Suitable wood material includes any type of wood product but typically takes the form of plywood, OSB, MDF, melamine, particle board, press board. Suitable plastic material includes both thermoplastic and thermosetting materials and can take the form of rigid, semi-rigid or flexible sheets or can be a foamed material. The plastic materials can be derived from polymers, copolymers and terpolymers derived from chemical groups including olefins, amides, amines, ethers, urethanes, esters, styrene, acrylonitrile, sulfones, vinyl chlorides, vinyl alcohols, epoxys, acrylates, substituted acyrlates, methacrylates, ethacrylates, vinyl esters and the like.

The optional insulating material can be provided to enhance the thermal and acoustical insulation properties and can be fiberglass, foamed polystyrene, HDPE type insulation or other type of insulation that is commonly available.

The firewall barrier assembly 10 preferably has high acoustical barrier characteristics. In a preferred form of the invention, the assembly 10 will have a sound transfer coefficient (STC) of about 50 or higher and more preferably will be from about 50 to about 65.

The firewall barrier assembly 10 can be easily assembled or retrofitted to existing structures. The method includes the steps of: inserting the preformed concrete wall 16 between the first structure and the second structure; and attaching the concrete wall 16 to the first structure with one or more anchors 15.

The step of inserting the preformed concrete wall 16 includes the step of positioning the wall 16 between the first structure and the second structure 12,14 and then attaching the wall 16 to an outer portion of one or more studs 26 using a plurality of anchors 15 spaced along the length of the stud 26 or studs. Cement boards made from AAC are typically light enough for one or more persons to accomplish this step by hand. It is also possible to utilize a crane or hoist to assist in guiding a cement board between the first and second structures.

Figure 10:
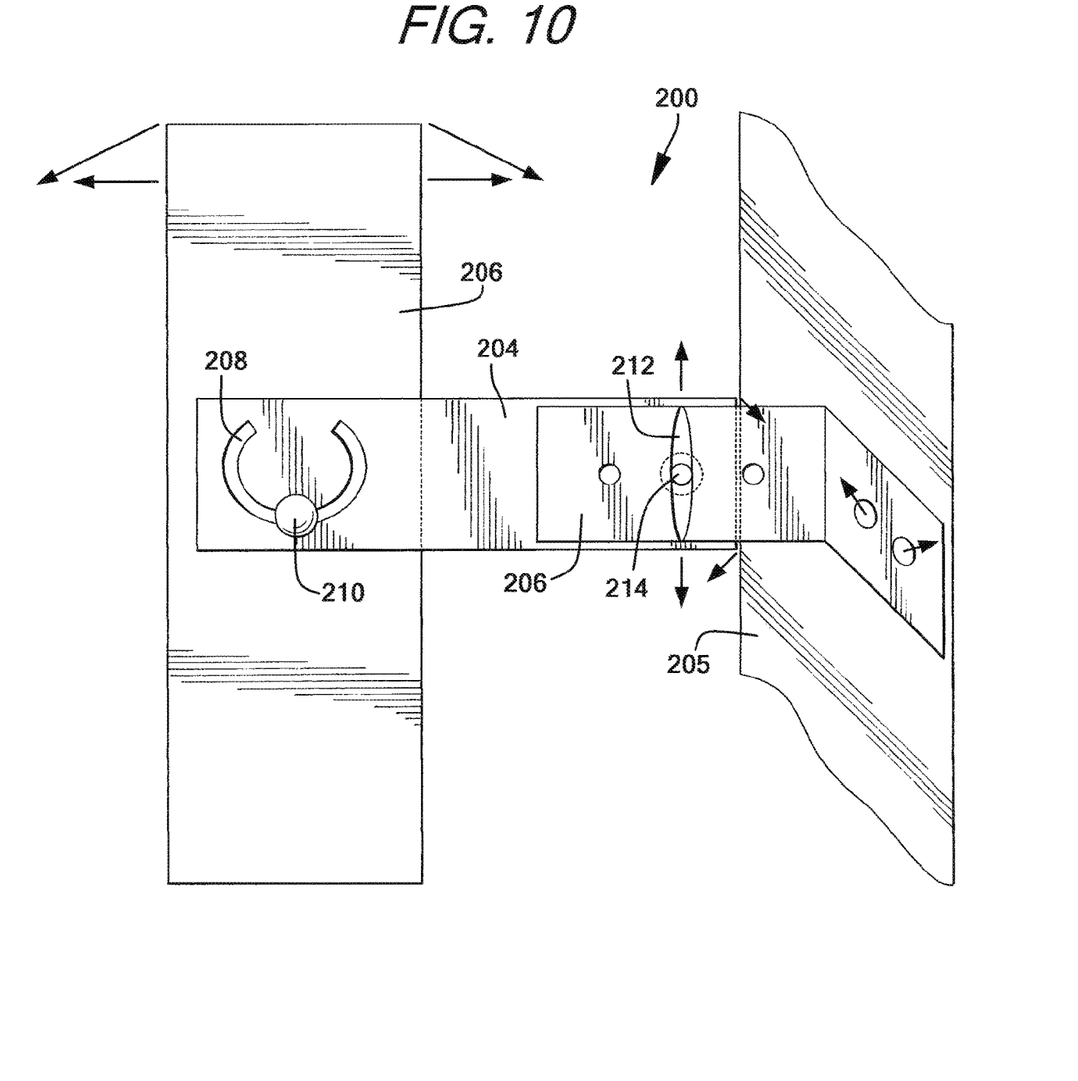
FIG. 10 is a schematic representation of an anchor of the present invention in an assembly for seismic construction.

FIG. 10 shows an assembly 200 having an anchor 202, an extension bar 204 extending from a surface of a structural element 206 such as a wall stud, and a preformed concrete wall 205. The extension bar 204 has a U-shaped channel 208 and a fastener 210 for attaching the extension bar to the structural element 206. The anchor 202 has an elongate slot 212 and is secured to the elongate bar with a fastener 214. This seismic assembly 200 accommodates lateral sway in view of a seismic event. The extension bar can be made of any suitable material selected from the metals, plastics and other material that are suitable for the anchor.

Figure 8:
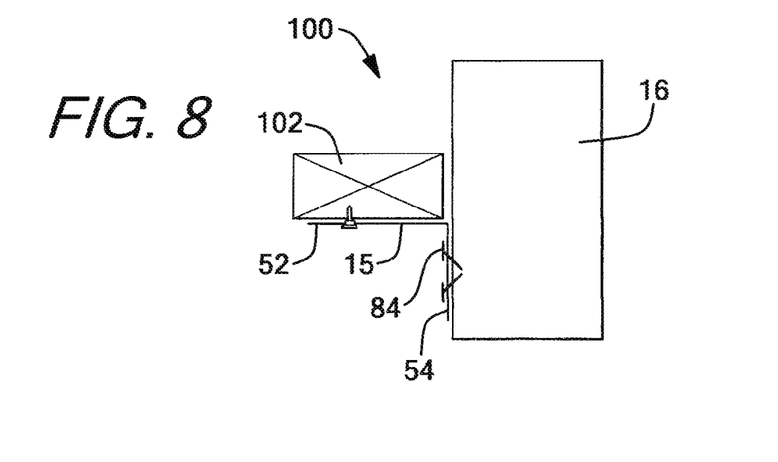
FIG. 8 is a top plan view of a portion of a firewall barrier assembly.

FIG. 8 shows a firewall assembly 100 having a stud 102, a preformed concrete wall 16, and an anchor 15. The first face 52 is secured to the stud 102 with the grommet assembly 76 or screw 84. The second face 54 is shown with two screws 84 extending at 20 degrees to the plane and in opposite directions attaching the second face 54 to the preformed concrete wall 16.

Figure 9:
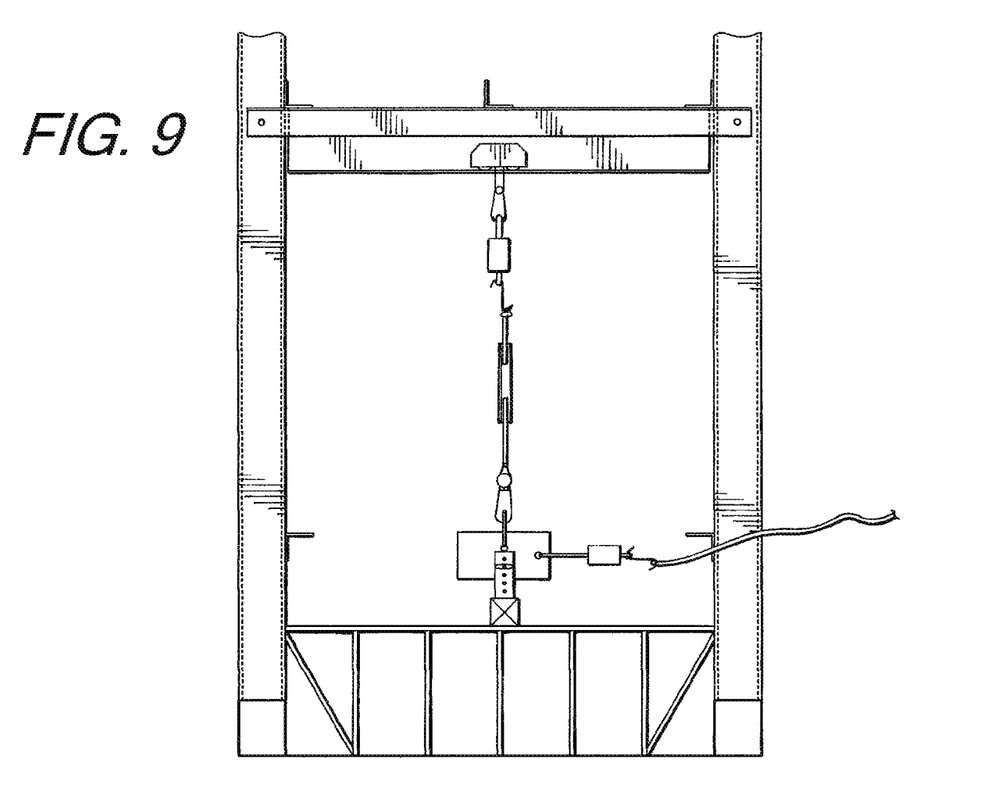
FIG. 9 is a schematic of a test apparatus to determine whether an anchor is suitable for use in a firewall barrier assembly.

FIG. 9 shows a testing apparatus to prove the anchors are capable of sliding in the elongate slot in a first direction when a stress is applied in a second direction in a slide test. A second test is whether the anchor maintains a connection with the first structure 12 and the preformed concrete wall 16 even if no sliding is allowed is a fail test. The testing apparatus 100 has the following parts and (quantities):

a. Dukane Steel Frame consisting of HSS 6×6×3/16 Gr 46 ksi steel columns and base legs ½" thick×14" wide steel top plate welded to 3/16" gusset plates and a base plate between steel columns. 3½"×3½"×5/16" steel column bracing.

b. (2) 3½"×3½"×5/16" angles (one on each side) sandwich and span between each column and are anchored to the columns with a ¾" diameter A304 thru bolt.

c. W8×15 steel beam placed between angles of steel frame and hanging from (3) 3×3×¼ angles welded to wide flange.

d. Item 9739233 1 ton push trolley bearing on bottom flange of beam.

e. 1" spring anchor (600 lbs capacity) for vertical pull and ¾" spring anchor (350 lbs capacity) for horizontal pull and may sometimes be referred to as a handle.

f. Modern step digital hanging scale with loop and hook (600 lbs capacity).

g. National hardware 6" galvanized hook and eye turnbuckle (SWL=1040 lbs).

h. 2×6 Hem Fir No. 2×9" max (represents wall stud)

i. Kingcord nylon dock line double diamond braid (SWL=550 lbs) to tie anchors to wood stud and for pulling rope j. anchor (test piece or test sample or sample)

k. 4"×4"×1'-0" long #2 pressurized treated timber base block to screw into. Base block is held down with C-clamps to steel frame.

The test procedure is as follows. An anchor or test piece as described above is installed onto the testing apparatus using a 2 ft level to try and plumb the location of the anchor to be directly in line with the trolley above for best results during testing. The anchor was slightly rotated, approximately 10 to 15 degrees from alignment with the columns in order to more easily access and apply a horizontal load without warping the anchor. The anchor sample is installed by fastening the 2" second face to the base member using two screws that are screwed in at 20 degrees in opposite directions to best mimic the installation into a precast AAC firewall panel. The anchor is then screwed to the wood stud with one screw, trying to align the connection with the vertical rope loop and horizontal rope loop connections as best as possible.

Once the anchor is installed, a vertical force or load is applied to the anchor by turning the turnbuckle to create tension in the vertical line assembly. This tension force will be applied at three different intervals such that it will increase to within a predetermined range and held for approximately 30 seconds prior to then applying a horizontal load to the connection by pulling on the rope that extends off to the right in FIG. 9. The horizontal movement will be observed, trying to reach a minimum of ¼" movement in the slotted connection while recording the horizontal tension force having to be applied to create the movement.

1. The first vertical load applied is from 20 to 40 lbs. This first vertical load is half of the capacity of the weakest link. The weakest link is the two grabber cement board screws used to attach the anchor to the AAC panel. One screw has a tension capacity of 58 lbs.

2. The second vertical load applied is from 41 to 70 lbs.—the full capacity of the two screws.

3. The third vertical load applied shall be 150 lbs. or greater.

After the vertical load has been applied to the anchor for approximately 30 seconds, a horizontal force is applied manually to one end of the anchor member using the handle. The horizontal load will test how much movement the anchor allows while being held in tension. The horizontal force shall be applied until ¼ inch of movement is observed in the elongate slot or for two minutes, whichever occurs first.

In testing of several anchor samples made in accordance with FIGS. 4A-4C, the results show that upon applying a vertical load in the first load range and specifically 31.2 lbs., 31.4 lbs., and 33.2 lbs. the grommet assembly moved relatively easily when a force was applied by the handle. In applying loads in the second load range of 50.4 lbs., 59.5 lbs., and 66.3 lbs., the anchors were deformed but still maintained connections with the stud and the preformed concrete wall. However, the grommet assemblies could only rock but not slide in the elongate slot. Upon applying loads in the third load range of 245 lbs., 197.3 lbs., and 182.7 lbs. the anchors failed. Thus, under the first load condition the anchor samples passed the "slide test" and the "fail test." Under the second loading condition the anchors failed the slide test but passed the fail test. Under the third loading conditions the anchors failed both the slide test and the fail test.

It should be noted that these firewalls are internal and typically are only subject to a partition lateral load of approximately 8 psf maximum. Therefore, it should be noted that the loads being applied are significantly higher than what one anchor would see in service once installed.

Another set of anchor samples made in accordance with FIGS. 3A-3C was tested but the grommet assembly only had a screw and a washer and the grommet was omitted. One of the anchor samples had a standard-sized elongate slot and the other two samples had an enlarged elongate slot. The teeth of the screw bore directly on a surface of the elongate slot. Under a first load force of 31.5 lbs., 37.2 lbs., and 28.6 lbs. the anchors passed both the slide and fail tests. Under the second load of 61.7 lbs., 62.8 lbs., and 46 lbs. the anchors failed the slide test but passed the fail test. Upon application of forces within the third load range the anchors failed both the slide test and the fail test.

Yet another anchor was tested that was made in accordance with FIGS. 3A-3C, with a standard-sized elongate slot, but only a screw was used to connect the first face to the first structure. No grommet or washer was used. Just the head of the screw was bearing against the face of the anchor. Upon application of a force in the first load range of 24.9 lbs. the anchor failed the slide test but passed the fail test. Upon application of a force in the second load range of 45.4 lbs. the anchor failed the slide test but passed the fail test. Upon application of a force in the third load range of 215.6 lbs, the anchor failed both the slide test and the fail test.

The terms "first," "second," "upper," "lower," "top," "bottom," "above," "below," etc. are used for illustrative purposes to associate relative positioning of elements to other elements only and are not intended to limit the embodiments in any way. The term "plurality" as used herein is intended to indicate any number greater than one, either disjunctively or conjunctively as necessary, up to an infinite number. The terms "joined," "attached," and "connected" as used herein are intended to put or bring two elements together so as to form a unit, and any number of elements, devices, fasteners, etc. may be provided between the joined or connected elements unless otherwise specified by the use of the term "directly" and/or supported by the drawings.

While specific embodiments have been illustrated and described, numerous modifications come to mind without departing from the spirit of the invention and the scope of protection is only limited by the scope of the accompanying claims.

We claim:

1. An anchor assembly for attaching a first structure to a second structure comprising:
   a body having a first face and a second face, the first face being transverse to the second face, the first face having an elongate slot having a length dimension and a width dimension, the length dimension being greater than the width dimension, the length dimension extending generally parallel to a plane defined by the second face, and the second face having a through hole;
   a grommet assembly slidably disposed within the elongate slot, the grommet assembly comprising a grommet and a washer adhered to a surface of the grommet;
   a first fastening member passing through the through hole in the second face to secure the body to the second structure at a fixed position; and
   a second fastening member passing through the grommet assembly for connecting the first face to first structure while allowing for sliding engagement of the grommet with the elongate slot in response to relative movement of the first structure and the second structure after the body has been attached to the first structure and the second structure.

2. The anchor assembly of claim 1, wherein the body is substantially L-shaped.

3. The anchor assembly of claim 1, wherein the second fastening member is a threaded fastener.

4. The anchor assembly of claim 1 wherein the grommet is centrally positioned in the elongate slot and a portion of the grommet is in surface contact with a portion of the body.

5. The anchor assembly of claim 1 wherein the grommet is comprised of an elastomeric material.

6. The anchor assembly of claim 1 further comprising an adhesive attaching the washer to the grommet.

7. The anchor assembly of claim 1 wherein the body is fabricated from a metal, a polymer, aluminum, aluminum alloys, or a composite material.

8. The anchor of claim 1 wherein the body is fabricated from a material that fails at a temperature in excess of 1000° F.

9. The anchor of claim 1 wherein the first structure is of frame construction and the second structure is of concrete construction.

\* \* \* \* \*